(12) United States Patent
Zhou et al.

(10) Patent No.: US 10,356,397 B2
(45) Date of Patent: Jul. 16, 2019

(54) THREE-DIMENSIONAL (3D) DISPLAY APPARATUS AND METHOD

(71) Applicant: Samsung Electronics Co., Ltd., Suwon-si, Gyeonggi-do (KR)

(72) Inventors: Mingcai Zhou, Chaoyang District Beijing (CN); DongKyung Nam, Yongin-si (KR); Jinho Lee, Suwon-si (KR); Kang Xue, Chaoyang District Beijing (CN); Weiming Li, Chaoyang District Beijing (CN); Xiying Wang, Chaoyang District Beijing (CN); Zhihua Liu, Chaoyang District Beijing (CN); Gengyu Ma, Chaoyang District Beijing (CN); Haitao Wang, Chaoyang District Beijing (CN); Tao Hong, Chaoyang District Beijing (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 357 days.

(21) Appl. No.: 14/987,972

(22) Filed: Jan. 5, 2016

(65) Prior Publication Data
US 2016/0241843 A1    Aug. 18, 2016

(30) Foreign Application Priority Data

Feb. 13, 2015   (CN) .......................... 2015 1 0080194
Sep. 4, 2015    (KR) ........................ 10-2015-0125640

(51) Int. Cl.
*G02B 3/00*    (2006.01)
*G02B 27/22*   (2018.01)
(Continued)

(52) U.S. Cl.
CPC ....... *H04N 13/305* (2018.05); *G02B 27/2264* (2013.01); *G02B 27/26* (2013.01);
(Continued)

(58) Field of Classification Search
CPC ........... H04N 13/0404; H04N 13/0486; G02B 27/2264; G02B 27/26; G02B 3/0062; G02B 27/2214
See application file for complete search history.

(56) References Cited

U.S. PATENT DOCUMENTS

2011/0182570 A1    7/2011   Yeh
2012/0092339 A1    4/2012   Pijlman et al.
(Continued)

FOREIGN PATENT DOCUMENTS

JP       5022964 B2       9/2012
JP       2014-153705 A    8/2014
(Continued)

*Primary Examiner* — Christopher S Kelley
*Assistant Examiner* — Nasim N Nirjhar
(74) *Attorney, Agent, or Firm* — Harness, Dickey & Pierce, P.L.C.

(57) ABSTRACT

A three-dimensional (3D) display apparatus and method are provided. The 3D display apparatus may include a display screen configured to display each of a plurality of sub-images included in a single frame of a 3D image using a time-division multiplexing (TDM), a polarizer configured to polarize each of the displayed sub-images by changing a polarization direction using the TDM, in synchronization with the display screen, and microlens arrays arranged in a plurality of layers and configured to sequentially refract the polarized sub-images, respectively.

20 Claims, 13 Drawing Sheets

(51) Int. Cl.
*G02B 27/26* (2006.01)
*H04N 13/305* (2018.01)
*H04N 13/315* (2018.01)

(52) U.S. Cl.
CPC ......... *H04N 13/315* (2018.05); *G02B 3/0062* (2013.01); *G02B 27/2214* (2013.01)

(56) References Cited

U.S. PATENT DOCUMENTS

| | | | |
|---|---|---|---|
| 2014/0028933 A1* | 1/2014 | Chen | G02B 27/26 349/15 |
| 2014/0232836 A1 | 8/2014 | Woodgate et al. | |
| 2014/0307068 A1* | 10/2014 | Song | H04N 13/0402 348/54 |
| 2016/0353097 A1* | 12/2016 | Fang | G02F 1/133 |

FOREIGN PATENT DOCUMENTS

| | | |
|---|---|---|
| KR | 10-1128519 B1 | 3/2012 |
| KR | 2013-0015936 A | 2/2013 |
| KR | 10-1294261 B1 | 8/2013 |
| WO | WO-2013/160815 A1 | 10/2013 |

* cited by examiner

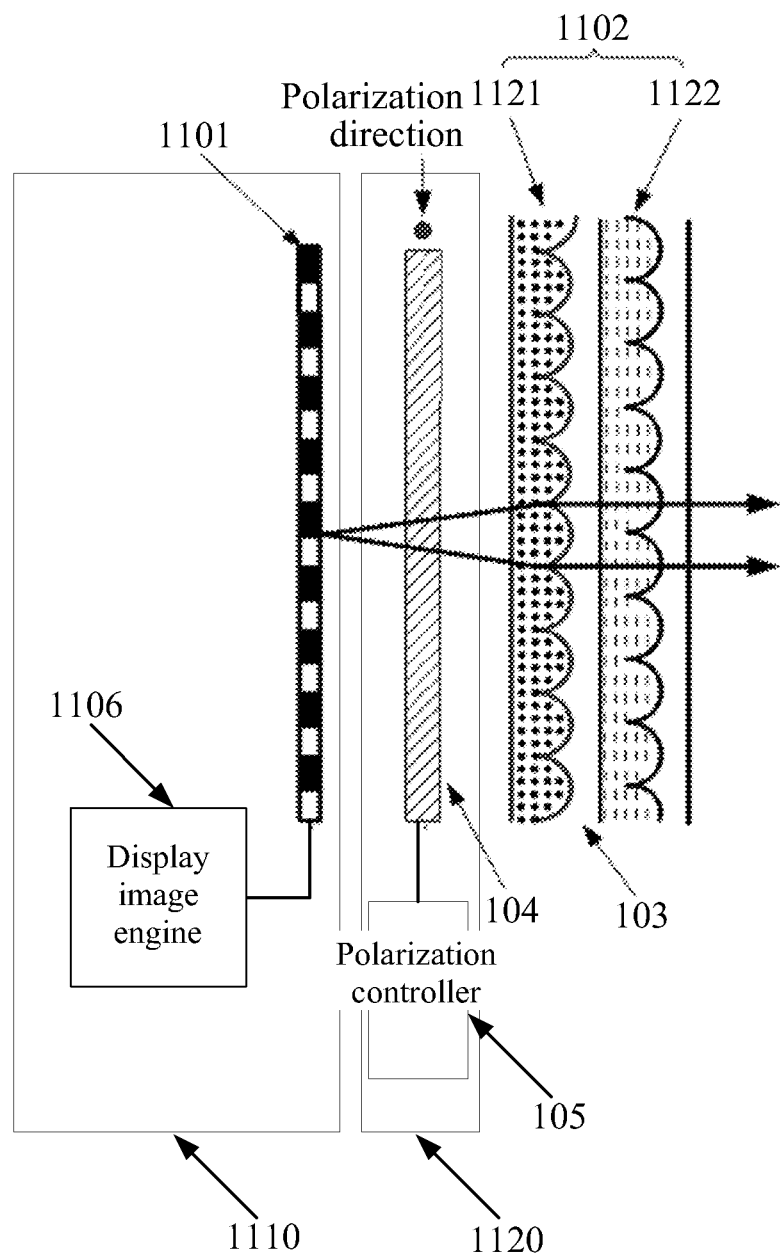

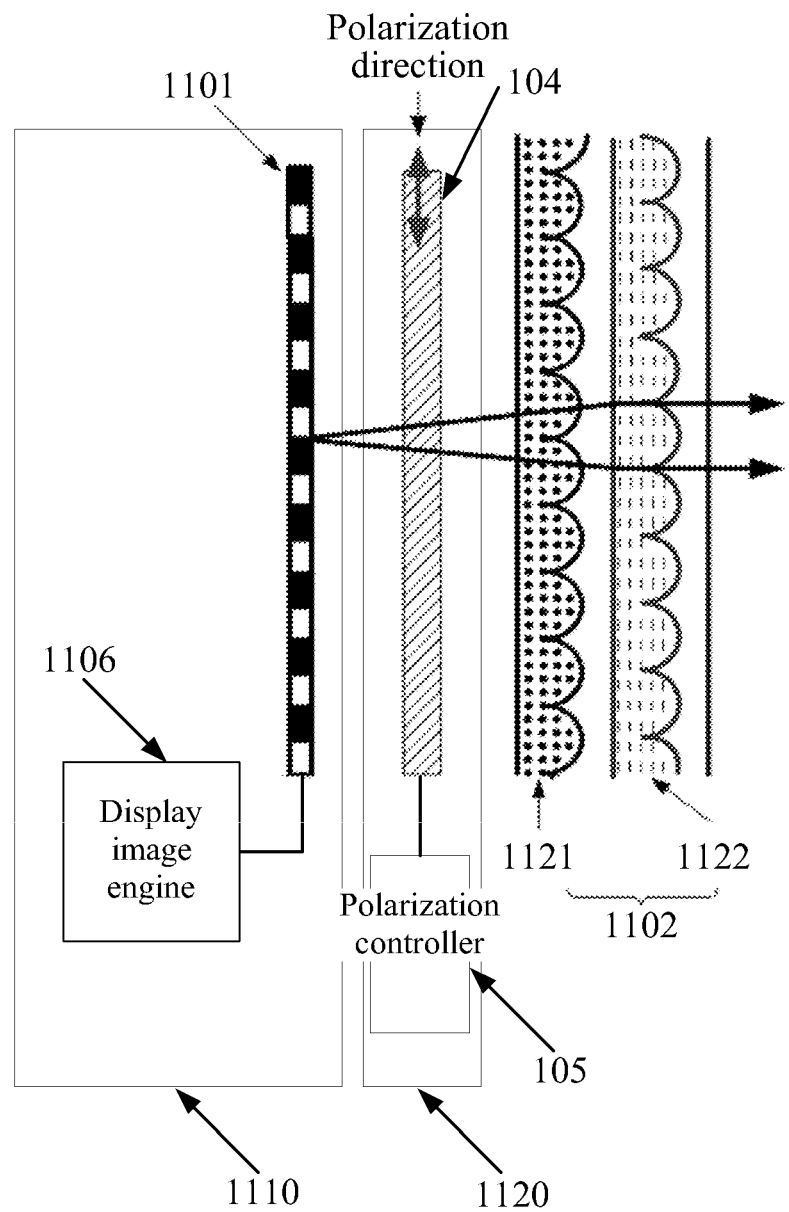

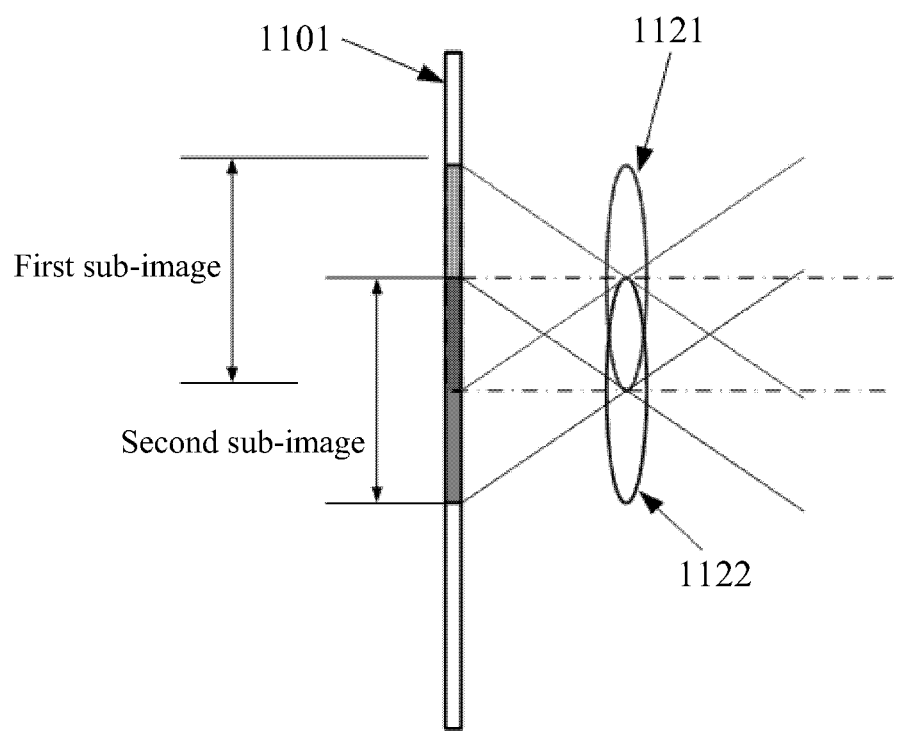

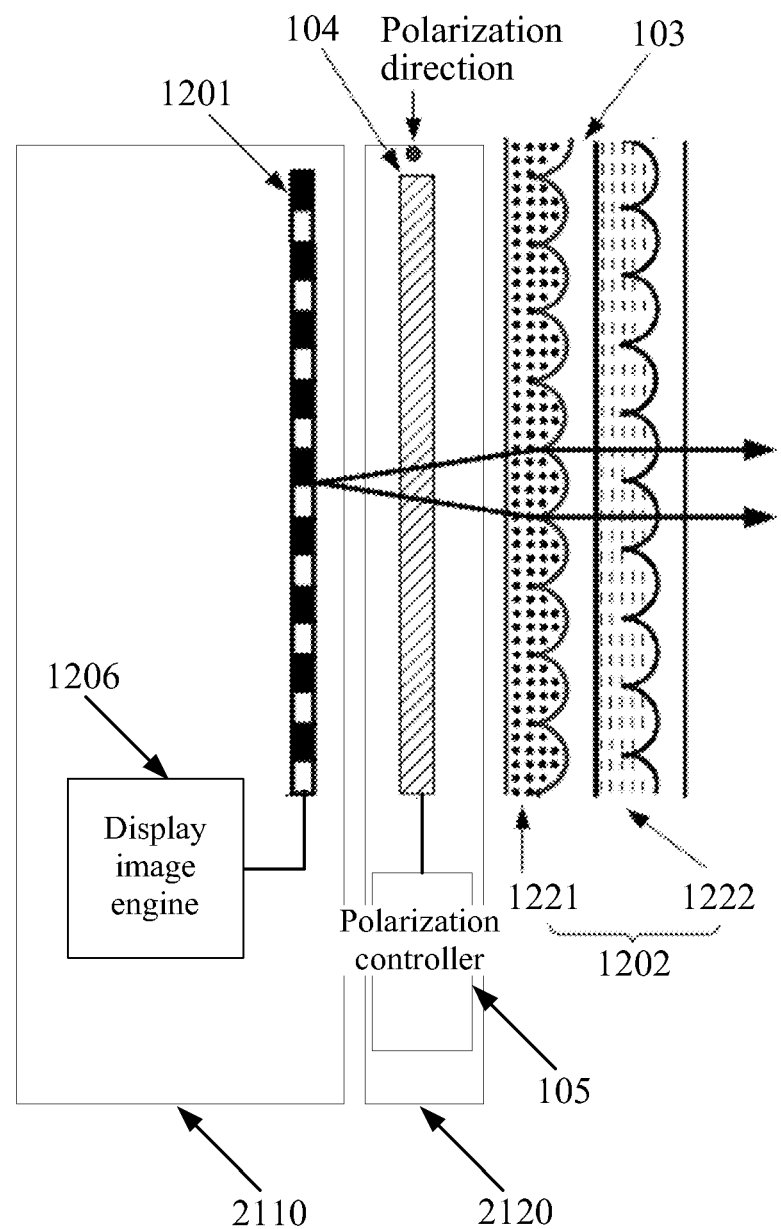

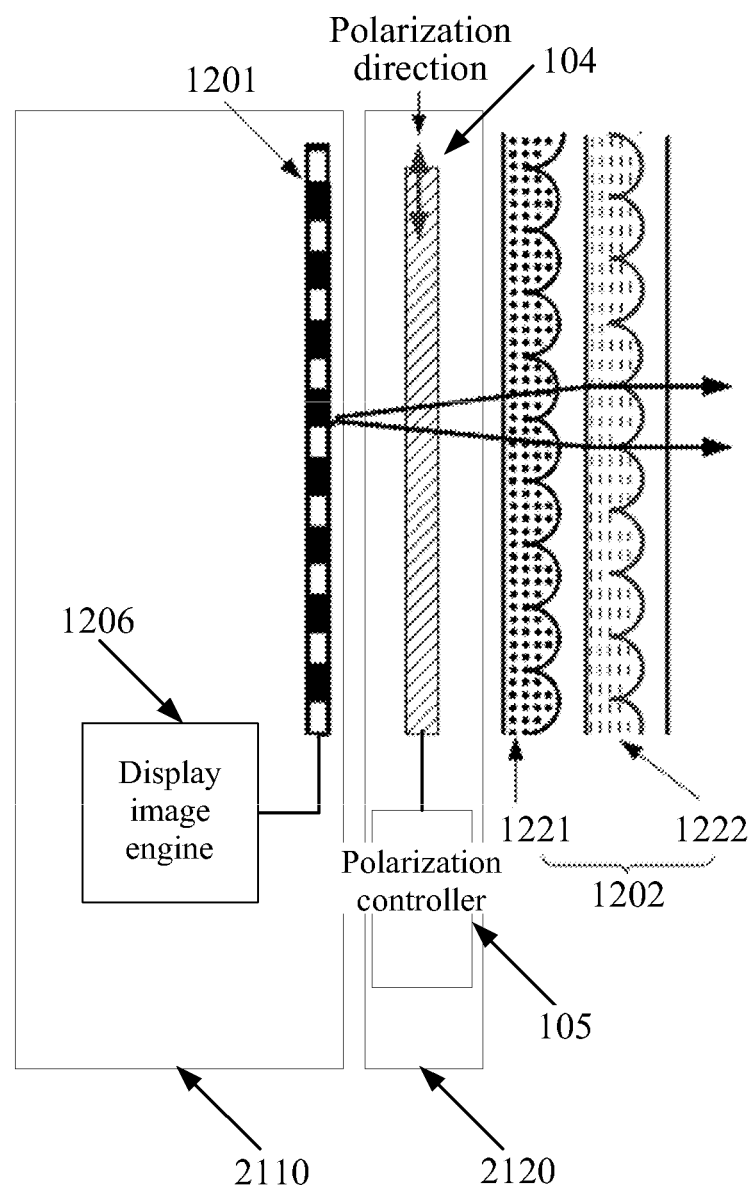

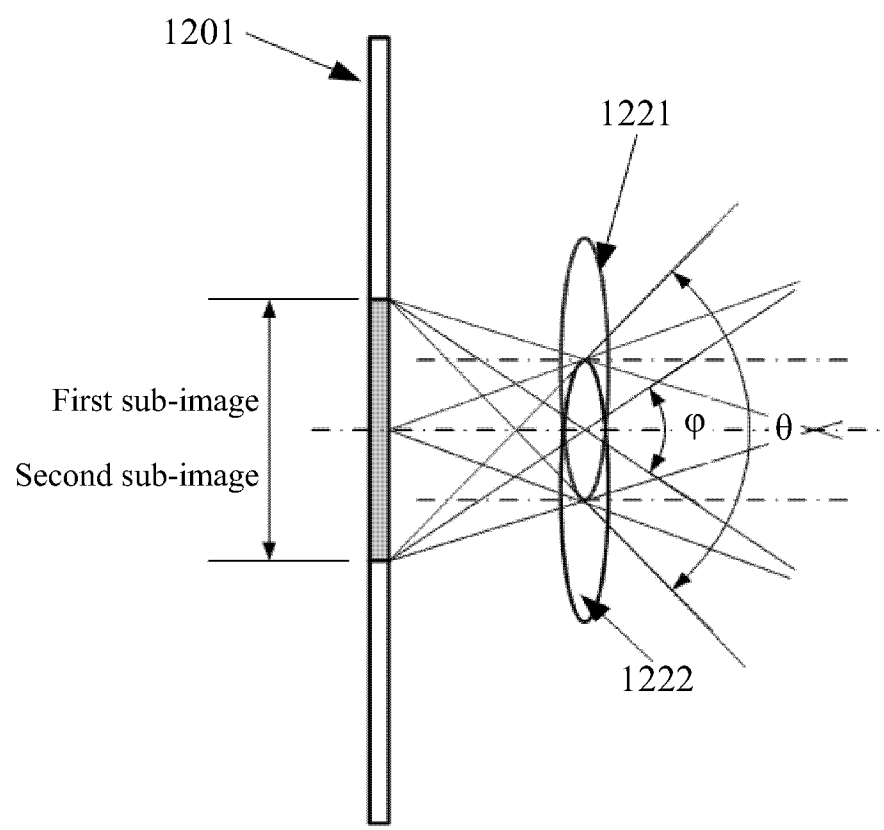

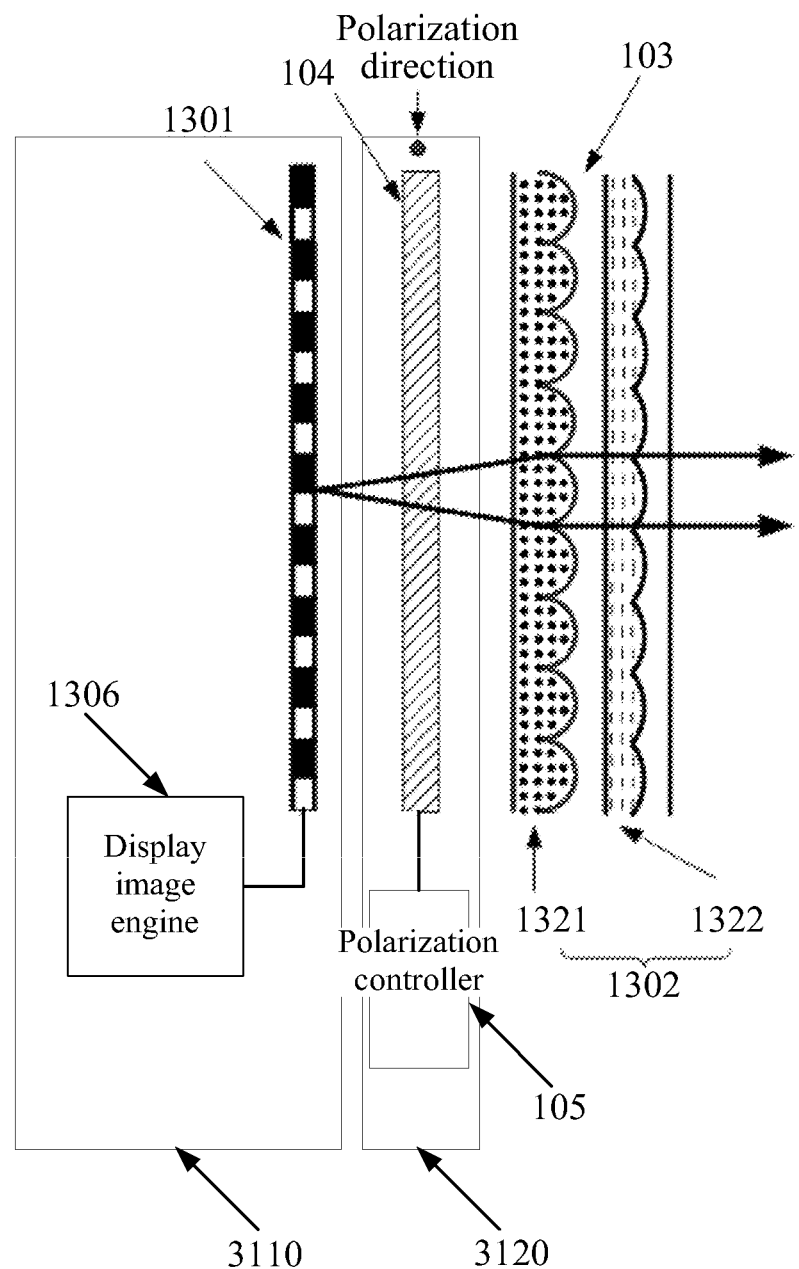

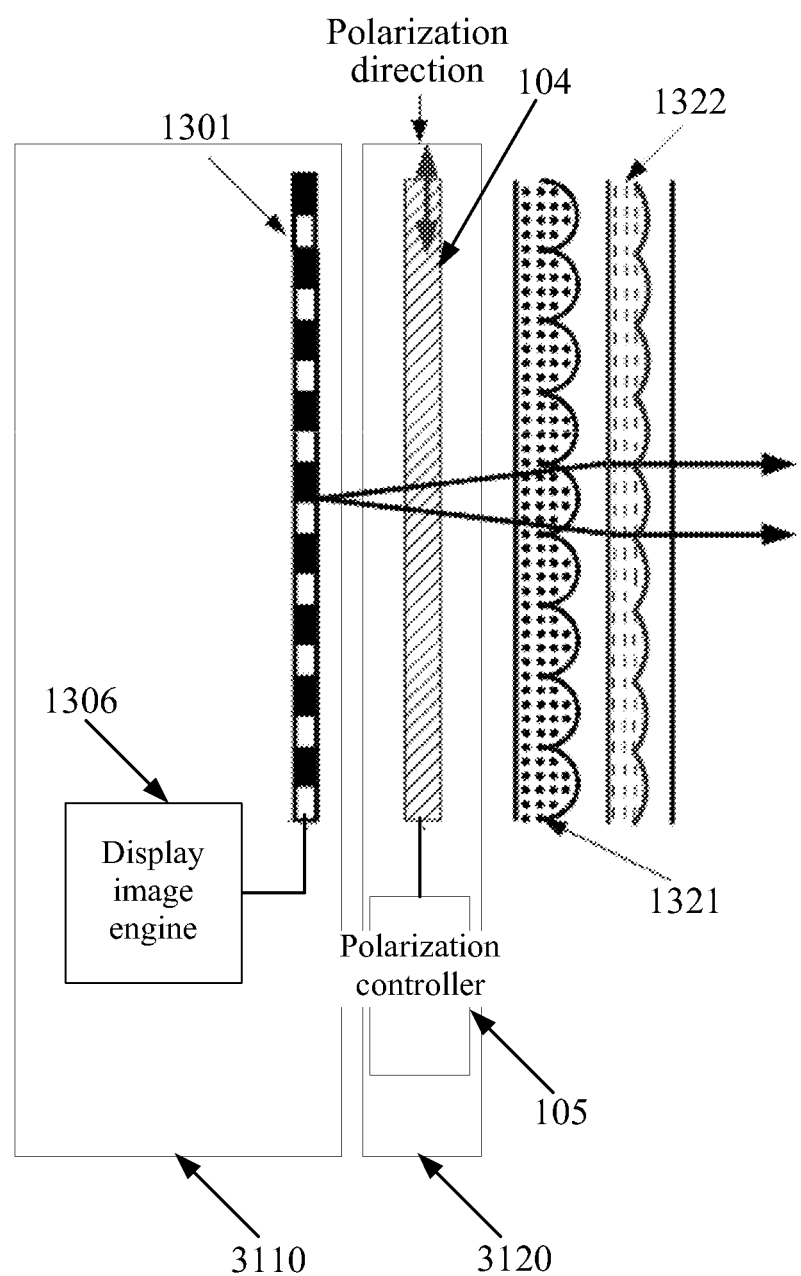

THREE-DIMENSIONAL (3D) DISPLAY APPARATUS AND METHOD

CROSS-REFERENCE TO RELATED APPLICATION(S)

This application claims under 35 U.S.C. § 119 to Chinese Patent Application No. 201510080194.5, filed on Feb. 13, 2015, in the State Intellectual Property Office of China, and Korean Patent Application No. 10-2015-0125640, filed on Sep. 4, 2015, in the Korean Intellectual Property Office, the entire disclosures of which are incorporated herein by reference for all purposes.

BACKGROUND

1. Field

At least one example embodiment relates to autostereoscopic three-dimensional (3D) display technology, and more particularly, to a 3D display apparatus and/or method.

2. Description of the Related Art

In comparison to two-dimensional (2D) display technology, three-dimensional (3D) display technology may realistically reproduce a scene of a real world and may allow persons to directly experience a 3D scene. Accordingly, the 3D display technology is receiving considerable interest in the fields of entertainment, medical treatment, and military.

The 3D display technology may be divided into two categories based on an image formation principle. The first category may include a non-autostereoscopic (or glasses) 3D display technology based on a viewing angle difference between both eyes. In the non-autostereoscopic (or glasses) 3D display technology, a user may need to wear special equipment, for example polarizing glasses or a helmet, to view a 3D image. Accordingly, amusement and convenience of watching the 3D image may be reduced, and an eye strain and inconvenience may occur when watching the 3D image for a long period of time. The second category may include holographic display technology, volumetric 3D display technology and autostereoscopic 3D display technology achieved with optical gratings. Among these technologies, the holographic 3D display system and the volumetric 3D display system have relatively complex structures. For example, the holographic 3D display system uses lightings, and the volumetric 3D display system uses a high-speed rotating display screen.

However, the autostereoscopic 3D display technology with optical gratings is being widely applied due to relatively simple and consecutive observation points.

SUMMARY

Some example embodiments relate to a three-dimensional (3D) display apparatus.

In some example embodiments, the 3D display apparatus may include a display screen configured to display each of a plurality of sub-images included in a single frame of a 3D image using a time-division multiplexing (TDM), a polarizer configured to polarize each of the displayed sub-images by changing a polarization direction using the TDM, in synchronization with the display screen, and microlens arrays configured to sequentially refract the polarized sub-images, respectively, the microlens arrays being arranged in a plurality of layers.

The polarizer may be configured to change the polarization direction based on a relationship between the display screen and a direction of an optical axis of a crystal of each of the microlens arrays.

The 3D display apparatus may further include at least one gap material layer located between the microlens arrays. The microlens arrays may have a plurality of refractive indices, respectively, and the plurality of refractive indices may be adjusted by a setting voltage. A microlens array with a refractive index adjusted to be different from a refractive index of the gap material layer may refract a polarized sub-image, and a microlens array with a refractive index adjusted to be the same as the refractive index of the gap material layer does not refract a polarized sub-image.

The sub-images may be acquired by converting the 3D image based on at least one of a focal length of each of the microlens arrays and an angle between a center of each of the microlens arrays and a center of the display screen.

The microlens arrays may include a first microlens array and a second microlens array, and the plurality of sub-images may include a first sub-image and a second sub-image. The display screen may be configured to display the first sub-image and the second sub-image during a first time segment and a second time segment, respectively. The polarizer may be configured to polarize the first sub-image by changing the polarization direction to a direction perpendicular to the display screen, and configured to polarize the second sub-image by changing the polarization direction to a direction parallel to the display screen. An optical axis of a crystal of the first microlens array may be perpendicular to the display screen, and the first microlens array may be configured to refract the first sub-image. An optical axis of a crystal of the second microlens array may be parallel to the display screen, and the second microlens array may be configured to refract the second sub-image.

The first sub-image may be acquired by converting the 3D image based on an angle between a center of the first microlens array and the center of the display screen. The second sub-image may be acquired by converting the 3D image based on an angle between a center of the second microlens array and the center of the display screen.

The first sub-image may be acquired by converting the 3D image based on a focal length of the first microlens array. The second sub-image may be acquired by converting the 3D image based on a focal length of the second microlens array.

The first microlens array and the second microlens array may have the same focal length. Microlenses in the first microlens array may be interleaved with microlenses in the second microlens array.

The first microlens array and the second microlens array may have different focal lengths. Microlenses in the first microlens array are aligned with microlenses in the second microlens array.

The 3D display apparatus may further include a gap material layer located between the first microlens array and the second microlens array. A refractive index of each of the first microlens array and the second microlens array may be adjusted by a setting voltage. When the polarizer changes the polarization direction to the direction perpendicular to the display screen, the refractive index of the first microlens array may be set to be different from a refractive index of the gap material layer, and the refractive index of the second microlens array may be set to be the same as the refractive index of the gap material layer. When the polarizer changes the polarization direction to the direction parallel to the display screen, the refractive index of the first microlens array may be set to be the same as the refractive index of the gap material layer, and the refractive index of the second microlens array may be set to be different from the refractive index of the gap material layer.

Other example embodiments relate to a 3D display method.

In some example embodiments, the 3D display method may include displaying, by a display screen, each of a plurality of sub-images included in a single frame of a 3D image using a TDM, polarizing, by a polarizer, each of the displayed sub-images by changing a polarization direction using the TDM, in synchronization with the display screen, and sequentially refracting, by microlens arrays, the polarized sub-images, respectively, the microlens arrays being arranged in a plurality of layers.

The polarizing of each of the displayed sub-images may include changing the polarization direction based on a relationship between the display screen and a direction of an optical axis of a crystal of each of the microlens arrays.

The sequentially refracting of the polarized sub-images may include refracting a polarized sub-image by a microlens array with a refractive index adjusted to be different from a refractive index of the gap material layer, and not refracting a polarized sub-image by a microlens array with a refractive index adjusted to be the same as the refractive index of the gap material layer.

The displaying of each of the sub-images may include displaying a first sub-image and a second sub-image during a first time segment and a second time segment, respectively. The polarizing of each of the displayed sub-images may include polarizing the first sub-image by changing the polarization direction to a direction perpendicular to the display screen, and polarizing the second sub-image by changing the polarization direction to a direction parallel to the display screen. The sequentially refracting of the polarized sub-images may include refracting the first sub-image by the first microlens array when an optical axis of a crystal of the first microlens array is perpendicular to the display screen, and refracting the second sub-image by the second microlens array when an optical axis of a crystal of the second microlens array is parallel to the display screen.

The refracting of the first sub-image may include, when the polarization direction is changed to the direction perpendicular to the display screen, setting the refractive index of the first microlens array to be different from a refractive index of the gap material layer, and setting the refractive index of the second microlens array to be the same as the refractive index of the gap material layer. The refracting of the second sub-image may include, when the polarizer changes the polarization direction to the direction parallel to the display screen, setting the refractive index of the first microlens array to be the same as the refractive index of the gap material layer, and setting the refractive index of the second microlens array to be different from the refractive index of the gap material layer.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 3A and 3B illustrate an example of a configuration of a 3D display apparatus according to at least one example embodiment;

FIG. 3D illustrates an example of a corresponding relationship between a display screen and a microlens array according to at least one example embodiment;

FIGS. 4A and 4B illustrate another example of a configuration of a 3D display apparatus according to at least one example embodiment;

FIG. 4C illustrates another example of a corresponding relationship between a display screen and a microlens array according to at least one example embodiment;

FIGS. 5A and 5B illustrate still another example of a configuration of a 3D display apparatus according to at least one example embodiment;

DETAILED DESCRIPTION

Figure 1:
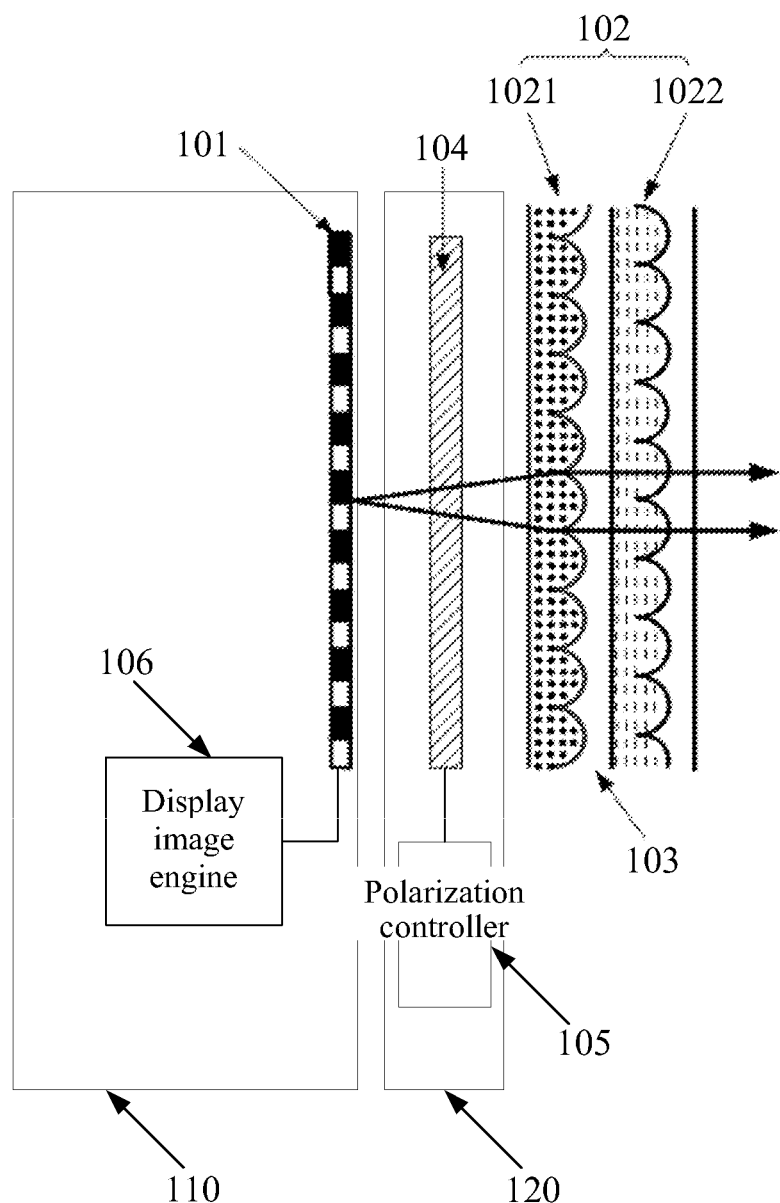
FIG. 1 illustrates a configuration of a three-dimensional (3D) display apparatus according to at least one example embodiment.

Hereinafter, some example embodiments will be described in detail with reference to the accompanying drawings. The scope of the present disclosure, however, should not be construed as limited to the embodiments set forth herein. Like reference numerals in the drawings refer to like elements throughout the present disclosure.

Various modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include," "including," "comprise," "comprising," and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

An autostereoscopic three-dimensional (3D) display apparatus with an optical grating may be implemented by a single-layer microlens array with an optical grating structure. A process of implementing a 3D display may be classified into a recording process and a reproducing process. In the recording process, object space information at different viewing angles may be recorded using a microlens array with an optical grating structure, and an image array of elements may be formed. In the reproducing process, a display screen may display the image array, and an image of an element displayed using the display screen may be formed at different viewing angles through microlenses of the microlens array based on a principle of reversibility of a light path, so that a shape of the original object may be implemented as an image.

The autostereoscopic 3D display apparatus may have a relatively low display resolution, and a display viewing angle provided to a user may be limited. Also, due to a narrow distance range of a display screen to view an exact 3D image, an image overlapping phenomenon may occur.

A 3D display apparatus and/or method according to at least one example embodiment may enhance a display quality.

According to at least one example embodiment, a 3D display apparatus may sequentially refract light using microlens arrays arranged in at least two layers, to realize a 3D display. The microlens arrays may provide a viewing angle difference between two directions, for example, a horizontal direction and a vertical direction, and accordingly the 3D display apparatus may more realistically display a 3D image of a real object.

A focal length of each of the microlens arrays, and a positional relationship between a display screen and each of the microlens arrays may be controlled. A polarization direction may be changed by a polarizer based on a polarization period set during a display period of a single frame of a 3D image, using time-division multiplexing (TDM). The display screen may display each of sub-images corresponding to the microlens arrays by which light is refracted, and each of the sub-images may be alternately refracted by each of the microlens arrays, and accordingly a 3D image may be displayed. Thus, it is possible to enhance a quality of a 3D display, for example, a display resolution, a display depth range and/or a viewing angle.

A 3D display apparatus according to at least one example embodiment may realistically display an object using microlens arrays arranged in at least two layers, and may enhance a quality of a display. A polarization controller may control a polarizer to change a polarization direction using TDM, and accordingly the microlens arrays may alternately refract light. A display image engine may control a display to display a sub-image corresponding to a microlens array by which light is currently refracted. An image formation angle or a number of microlenses to form an image may be increased by adjusting the polarization direction and the microlens arrays based on a sub-image displayed on a display screen, and accordingly it is possible to enhance a performance of the display in terms of a resolution or a display viewing angle within a reaction time of a human eye. Different focal lengths of the microlens arrays may be set, and accordingly it is possible to increase a whole display depth range of the 3D display apparatus based on a plurality of display depth ranges formed due to the different focal lengths.

FIG. 1 illustrates a configuration of a 3D display apparatus according to at least one example embodiment.

Referring to FIG. 1, the 3D display apparatus may include a display 110, microlens arrays 102, and a polarization device 120 that is installed between the display 110 and the microlens arrays 102. The microlens arrays 102 may be arranged in at least two layers, and may include, for example, a first microlens array 1021 and a second microlens array 1022.

The polarization device 120 may change a polarization direction of light using time-division multiplexing (TDM) so that the microlens arrays 102 may sequentially refract the light.

The display 110 may display a plurality of sub-images included in a single frame of a 3D image using TDM.

The display 110 may include a display screen 101 and a display image engine 106 (e.g., implemented as a special purpose processor).

The polarization device 120 may include a polarizer 104 and a polarization controller 105 (e.g., implemented as a special purpose processor).

The microlens arrays 102 may be installed in parallel to the display screen 101. Microlenses of each of the microlens arrays 102 may have the same structure. Microlenses may be arranged in a quadrangular array or a hexagonal array, and neighboring microlenses may be arranged at equal pitches.

Figure 2A:
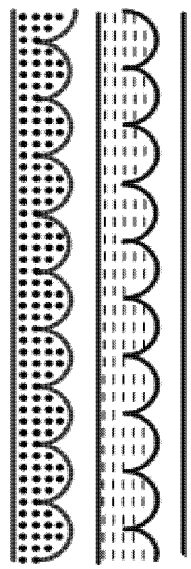
FIG. 2A illustrates an example of a microlens array including convex microlenses according to at least one example embodiment.
Figure 2B:
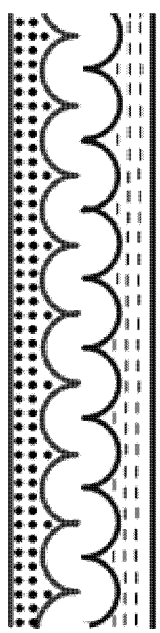
FIG. 2B illustrates an example of a microlens array including concave microlenses according to at least one example embodiment.

FIG. 2A illustrates an example of a microlens array including convex microlenses, and FIG. 2B illustrates an example of a microlens array including concave microlenses.

As shown in FIGS. 2A and 2B, each of microlens arrays may include convex microlenses or concave microlenses.

An included angle between an optical axis of a crystal of a microlens array and an optical axis of a crystal of a neighboring microlens array may be set, and accordingly the microlens arrays 102 in the 3D display apparatus of FIG. 1 may alternately refract incident light with different polarization directions.

The microlens arrays 102 may have a plurality of refractive indices, respectively, and the refractive indices may be different from each other based on light polarized in different polarization directions.

A gap material layer 103 may be installed or located between the microlens arrays 102 so that light may be refracted by the microlens arrays 102 under a desired (or alternatively, predetermined) condition. A refractive index of the gap material layer 103 may be the same as a refractive index of one of the microlens arrays 102. A thickness of the gap material layer 103 may be implemented in microns ($\mu$).

When a refractive index of one of the microlens arrays 102 is the same as the refractive index of the gap material layer 103, light is not refracted. When a refractive index of one of the microlens arrays 102 is different from the refractive index of the gap material layer 103, light may be refracted.

For example, considering that air has a constant refractive index, the gap material layer 103 may be air between the microlens arrays 102. In this example, when a refractive index of one of the microlens arrays 102 is different from a refractive index of the air between the microlens arrays 102, light may be refracted.

The display screen 101 may display each of a plurality of sub-images included in a single frame of a 3D image, using TDM. The polarizer 104 may change a polarization direction using TDM, in synchronization with the display screen 101, and may polarize each of the displayed sub-images. The microlens arrays 102 may sequentially refract the polarized sub-images, respectively.

The polarizer 104 may change the polarization direction based on a relationship between the display screen 101 and a direction of an optical axis of a crystal of each of the microlens arrays 102.

The microlens arrays 102 may have a plurality of refractive indices, and the plurality of refractive indices may be adjusted by a setting voltage. For example, a microlens array with a refractive index adjusted to be different from the refractive index of the gap material layer 103 may refract a sub-image, and a microlens array with a refractive index adjusted to be the same as the refractive index of the gap material layer 103 does not refract a sub-image.

Each of the sub-images may be acquired by converting the 3D image based on at least one of a focal length of each of the microlens arrays 102 and an angle between a center of each of the microlens arrays 102 and a center of the display screen 101.

In an example, the microlens arrays 102 may be arranged in two layers, and may have two refractive indices, respectively. In this example, the display 110 may display two sub-images included in a single frame of a 3D image, using TDM. The polarization device 120 may change two types of polarization directions using TDM, in synchronization with the display 110, and may polarize each of the displayed sub-images. The microlens arrays 102 configured to sequentially refract light may refract the sub-images, respectively, so that the 3D image may be displayed.

In another example, the microlens arrays 102 may be arranged in three layers, and may have three refractive indices, respectively. In this example, the display 110 may display three sub-images included in a single frame of a 3D image, using TDM. The polarization device 120 may change three types of polarization directions using TDM, in synchronization with the display 110, and may polarize each of the displayed sub-images. The microlens arrays 102 configured to sequentially refract light may refract the sub-images, respectively, so that the 3D image may be displayed.

In still another example, the microlens arrays 102 may be arranged in four layers, and may have four refractive indices, respectively. In this example, the display 110 may display four sub-images included in a single frame of a 3D image, using TDM. The polarization device 120 may change four types of polarization directions using TDM, in synchronization with the display 110, and may polarize each of the displayed sub-images. The microlens arrays 102 configured to sequentially refract light may refract the sub-images, respectively, so that the 3D image may be displayed.

When the microlens arrays 102 are arranged in two layers and have two refractive indices, respectively, for example, when the 3D display apparatus includes the first microlens array 1021 and the second microlens array 1022, as shown in FIG. 1, an optical axis of a crystal of the first microlens array 1021 may be orthogonal to an optical axis of a crystal of the second microlens array 1022. The first microlens array 1021 and the second microlens array 1022 may be arranged in neighboring layers. A direction of an optical axis of a crystal of one of the two layers may be parallel to the display screen 101, and a direction of an optical axis of a crystal of the other layer may be perpendicular to the display screen 101.

When the microlens arrays 102 are arranged in two layers and have two refractive indices, respectively, a gap material layer 103 with a single refractive index may be additionally installed. The refractive index of the gap material layer 103 may be the same as one of the two refractive indices of the microlens arrays 102. When a value of each of the two refractive indices is assumed to be changed to a value between "n1" and "n2," the refractive index of the gap material layer 103 may have a value of "n2." In this example, when the two refractive indices are set to "n2," light passing through the microlens arrays 102 and the gap material layer 103 is not refracted.

The polarizer 104 of the polarization device 120 may be installed between the display screen 101 and the microlens arrays 102, as described above. The polarization controller 105 of the polarization device 120 may control the polarizer 104 to change a polarization direction.

When the polarizer 104 changes a polarization direction, a refractive index of a microlens array 102 having an optical axis of a crystal in the same direction as the changed polarization direction may be different from the refractive index of the gap material layer 103. A refractive index of the other microlens array 102 having an optical axis of a crystal in a different direction from the changed polarization direction, may be the same as the refractive index of the gap material layer 103. Based on a relationship between the display screen 101 and a direction of an optical axis of a crystal of each of the microlens arrays 102, the polarization controller 105 may control the polarizer 104 to change the polarization direction, and accordingly a value of a refractive index of each of the microlens arrays 102 may be adjusted.

For example, when the microlens arrays 102 are arranged in two layers and have two refractive indices, respectively, the polarization device 120 may change a polarization direction of light to a direction parallel or perpendicular to the display screen 110 based on a polarization change period.

A display period of a single frame of a 3D image may include two display switching periods that are set based on user input and/or a design parameter based on empirical evidence. The display 110 may switch and display sub-images included in the frame based on the display switching periods. For example, a polarization change period of the polarization device 120 may be set to be the same as a display switching period, and accordingly a single frame of a 3D image may be displayed in 3D. During a display period of a 3D image, the display 110 may switch and display sub-images included in a single frame of the 3D image, while the polarization device 120 changes a polarization direction, so that the 3D image may be displayed.

A polarization direction changed during one time segment of a display period of a single 3D image may be parallel to the display screen 101, and a polarization direction changed during another time segment may be perpendicular to the display screen 101.

The polarization controller 105 may control the polarizer 104 to change the polarization direction to a direction parallel to the display screen 101 during one time segment of a display period of a single frame of a 3D image, and may control the polarizer 104 to change the polarization direction to a direction perpendicular to the display screen 101 during another (e.g., subsequent) time segment.

When the polarization direction is parallel to the display screen 101, an optical axis of a crystal of a microlens array 102 set to have a different refractive index from the refractive index of the gap material layer 103 may be parallel to the display screen 101, and an optical axis of a crystal of a microlens array 102 set to have the same refractive index as the refractive index of the gap material layer 103 may be perpendicular to the display screen 101.

Light incident in the polarization direction changed by the polarizer 104 may be refracted by a microlens array 102 having a different refractive index from the refractive index of the gap material layer 103. The light is not refracted by a microlens array 102 having the same refractive index as the refractive index of the gap material layer 103, which may indicate a characteristic of a single optical plate.

The display image engine 106 of the display 110 may control the display screen 101 based on the polarization direction changed by the polarizer 104. The display image engine 106 may control the display screen 101 to display a sub-image corresponding to a microlens array 102 by which light incident in the polarization direction is refracted.

A sub-image may correspond to a microlens array 102 by which light incident in the polarization direction is refracted. The sub-image may be acquired by converting a 3D image representing an object to be displayed, for example, based on a focal length of the microlens array 102 and an included angle between a center of the microlens array 102 and the display screen 101. The 3D image may be converted using a technology available to one of ordinary skill in the art.

A sub-image corresponding to a microlens array 102 by which light is refracted may have the same content as an image formed after light is refracted by the microlens array 102. Based on a principle of reversibility of a light path, sub-images corresponding to the microlens arrays 102 may be displayed on the display screen 101, and an object may be displayed in 3D through the microlens arrays 102.

Because the microlens arrays 102 may provide a viewing angle difference between a horizontal direction and a vertical direction, a 3D image displayed through the microlens arrays 102 may more realistically represent a real object.

The microlens arrays 102 may be formed of materials with various refractive indices controlled by electricity. When a setting voltage is applied to the microlens arrays 102 (e.g., by a voltage source not shown), the microlens arrays 102 may have the same refractive index as that of the gap material layer 103. In other words, when a polarization direction of incident light is changed, the refractive indices of the microlens arrays 102 may remain unchanged due to the setting voltage and have the same as the refractive index of the gap material layer 103, and accordingly light is not refracted. In this example, the 3D display apparatus may display a two-dimensional (2D) image. However, when a display of a 3D image is required, another setting voltage may be applied to the microlens arrays 102, and a characteristic of a multi-refractive index of the microlens arrays 102 may be restored. By controlling a voltage applied to the microlens arrays 102, a 2D display model and a 3D display model may be switched, and thus it is possible to increase a range of user experience.

The 3D display apparatus may enhance a quality of a 3D display based on controlling of sub-images displayed on the display screen 101, a focal length of each of the microlens arrays 102, and a position relationship between each of the microlens arrays 102 and the display screen 101, and may provide a user with an enhanced viewing angle effect.

Based on a 3D display apparatus and method according to at least one example embodiment, the following three examples are provided.

In Example 1, microlenses in one of microlens arrays arranged in two layers may be interleaved with (or offset from) microlenses in the other microlens array. When a polarization direction is changed, a sub-image corresponding to a microlens array in which refraction occurs may be displayed on a portion of a display screen corresponding to the microlens array. Thus, a resolution of a 3D display may be enhanced.

In Example 2, microlenses in one of microlens arrays arranged in two layers may be interleaved with (or offset from) microlenses in the other microlens array. When a polarization direction is changed, sub-images corresponding to microlens arrays in which refraction occurs may be displayed on the same portion of a display screen. Thus, a viewing angle effect of a 3D display may be enhanced.

In Example 3, focal lengths of microlens arrays arranged in two layers may be the same or different from each other. Microlenses in one of the microlens arrays may be aligned with microlenses in the other microlens array. When a polarization direction is changed, sub-images corresponding to microlens arrays in which refraction occurs may be displayed on the same portion of a display screen. Thus, a depth range of a 3D display may be enhanced.

Example 1

FIGS. 3A and 3B illustrate a configuration of a 3D display apparatus in Example 1.

Referring to FIGS. 3A and 3B, the 3D display apparatus may include a display 1110, microlens arrays 1102, and a polarization device 1120 that is installed between the display 1110 and the microlens array 1102. The microlens arrays 1102 may be arranged in two layers, and may include, for example, a first microlens array 1121 and a second microlens array 1122.

The display 1110 may include a display screen 1101 and a display image engine 1106 (e.g., implemented as a special purpose processor).

A polarization device 1120 may include a polarizer 104 and a polarization controller 105 (e.g., implemented as a special purpose processor).

The 3D display apparatus may further include a gap material layer 103 located between the microlens arrays 1102.

The microlens arrays 1102 may be installed in parallel to the display screen 1101, and may have the same focal length. Microlenses in the first microlens array 1121 may be interleaved with microlenses in the second microlens array 1122 neighboring the first microlens array 1121.

For example, when the microlens arrays 1102 are arranged in two layers and have two refractive indices, respectively, the microlenses in the second microlens array 1122 may be interleaved with the microlenses in the first microlens array 1121.

Figure 3C:
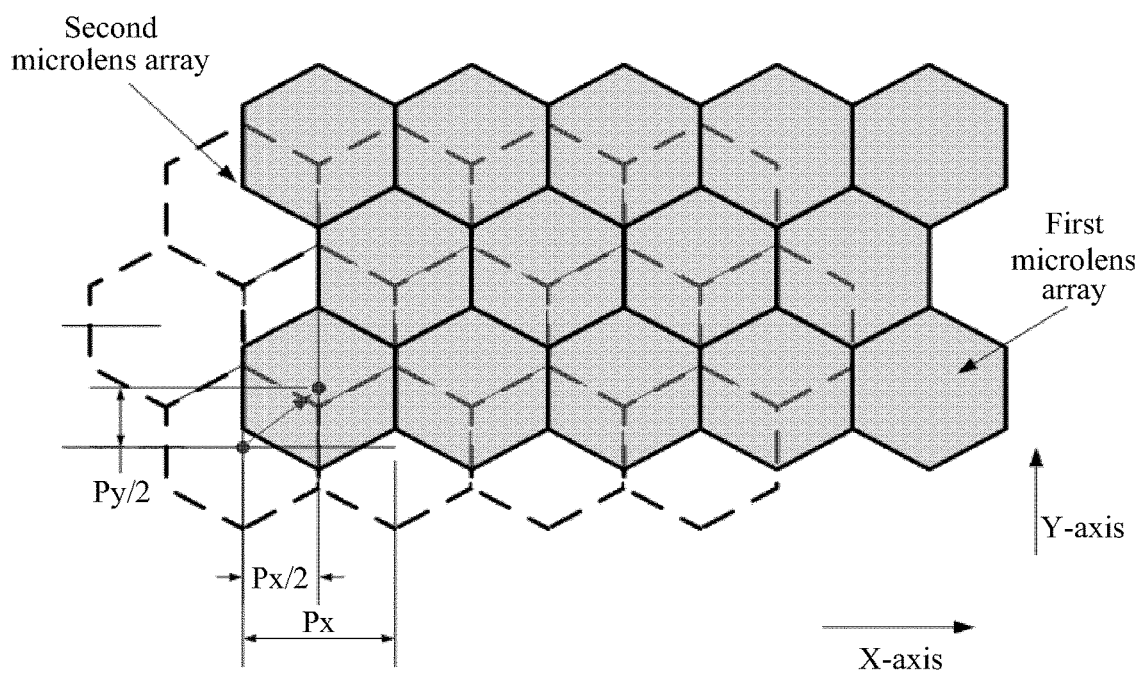
FIG. 3C illustrates an example of an arrangement of microlenses in two microlens arrays according to at least one example embodiment.

An offset between microlenses may be set by a user and/or a design parameter set based on empirical evidence. For example, the microlenses in the first microlens array 1121 and the microlenses in the second microlens array 1122 may be arranged at "m" pitches in a horizontal direction and a vertical direction. In this example, "m" may be "½," or other non-integer numbers. Referring to FIG. 3C, a microlens in the first microlens array 1121 and a microlens in the second microlens array 1122 may be arranged at "½" pitch.

Due to a difference in a horizontal position and a vertical position between the microlenses in the first microlens array 1121 and the microlenses in the second microlens array 1122, an image formed by the first microlens array 1121 and an image formed by the second microlens array 1122 may be displayed in different positions and with different content, when the images represent the same object.

A user may perceive images displayed in different positions and with different content to represent the same object while viewing the images displayed in 3D. Thus, it is possible to provide a 3D image with a rich 3D effect and a high resolution.

The polarization device 1120 may change a polarization direction to a direction parallel or perpendicular to the display 1110 based on a set polarization change period. Synchronously (or simultaneously), the display 1110 may switch and display a first sub-image and a second sub-image included in a single frame of a 3D image, based on a set display switching period. The first sub-image and the second sub-image may be displayed on a first display portion and a second display portion of the display screen 1101, respectively.

For example, the polarization device 1120 may change a polarization direction of light to a direction parallel to the display screen 1101 during one time segment of a display period of a single frame of a 3D image, and may change the polarization direction to a direction perpendicular to the display screen 1101 during another time segment. Synchronously, the display 1110 may display the first sub-image in the first display portion of the display screen 1101 during one time segment of the display period, and may display the second sub-image in the second display portion of the display screen 1101 during another time segment.

Referring to FIG. 3D, the display image engine 1106 may control the display screen 1101 to display the first sub-image on the first display portion during one time segment of a display period of a single frame of a 3D image, and to display the second sub-image in the second display portion during another time segment.

The first display portion and the second display portion may be spaced apart from each other by "m" pitches in the horizontal direction and the vertical direction, and may be acquired by converting the 3D image based on different image formation angles.

For example, a first image formation angle may be determined based on an included angle between a center of the first microlens array 1121 and a center of the display screen 1101. Also, a second image formation angle may be determined based on an included angle between a center of the second microlens array 1122 and the center of the display screen 1101. The first sub-image and the second sub-image may be acquired by converting the 3D image based on the first image formation angle and the second image formation angle. In this example, the first sub-image and the second sub-image may correspond to the first microlens array 1121 and the second microlens array 1122, respectively.

An optical axis of a crystal of the first microlens array 1121 may be perpendicular to the display screen 1101, and an optical axis of a crystal of the second microlens array 1122 may be parallel to the display screen 1101.

To enhance a resolution of a 3D display, the 3D display apparatus of Example 1 may be used to perform the following scheme.

Referring to FIG. 3A, the display image engine 1106 may control the display screen 1101 to display the first sub-image on the first display portion during one time segment of a display period of a single frame of a 3D image. Synchronously, the polarization controller 105 may control the polarizer 104 to change a polarization direction to the direction perpendicular to the display screen 1101.

When the polarization direction is changed, the first microlens array 1121 may have a different refractive index from a refractive index of the gap material layer 103, and may operate as a single lens. The first sub-image corresponding to the first microlens array 1121 may be displayed on the first display portion. Based on the displayed first sub-image, a 3D display may be implemented. The second microlens array 1122 may have the same refractive index as the refractive index of the gap material layer 103, and accordingly a characteristic of a single optical plate may be exhibited.

Referring to FIG. 3B, the display image engine 1106 may control the display screen 1101 to display the second sub-image on the second display portion during another time segment of the display period. Synchronously, the polarization controller 105 may control the polarizer 104 to change a polarization direction to the direction parallel to the display screen 1101.

When the polarization direction is changed, the second microlens array 1122 may have a different refractive index from the refractive index of the gap material layer 103, and may operate as a single lens. The second sub-image corresponding to the second microlens array 1122 may be displayed on the second display portion. Based on the displayed second sub-image, a 3D display may be implemented. The first microlens array 1121 may have the same refractive index as the refractive index of the gap material layer 103, and accordingly a characteristic of a single optical plate may be exhibited.

In Example 1, the microlenses in the second microlens array 1122 may be interleaved with (or offset from) the microlenses in the first microlens array 1121. The polarization controller 105 may control an operation by which the polarizer 104 switches the polarization direction, at a high speed based on a frequency higher than a reaction time of a human eye. Synchronously, the display image engine 1106 may control the display screen 1101 to display desired (or alternatively, predetermined) sub-images on desired (or alternatively, predetermined) portions, respectively, so that the first microlens array 1121 and the second microlens array 1122 may alternately form images. When a number of microlenses to form a 3D image increases, effects generated by an increase in the number of the microlenses may be combined and a performance of image formation may be enhanced. Human eyes may sense a 3D shape and may perceive the 3D shape as a single object, and a resolution may be enhanced.

Example 2

FIGS. 4A and 4B illustrate a configuration of a 3D display apparatus in Example 2.

Referring to FIGS. 4A and 4B, the 3D display apparatus may include a display 2110, microlens arrays 1202, and a polarization device 2120 that is installed between the display 2110 and the microlens arrays 1202. The microlens arrays 1202 may be arranged in two layers, and may include, for example, a first microlens array 1221 and a second microlens array 1222.

The display 2110 may include a display screen 1201 and a display image engine 1206 (e.g., implemented as a special purpose processor).

The polarization device 2120 may include a polarizer 104 and a polarization controller 105 (e.g., implemented as a special purpose processor).

The 3D display apparatus may further include a gap material layer 103 located between the microlens arrays 1202.

The microlens arrays 1202 may be installed in parallel to the display screen 1201, and may have the same focal length. Microlenses in the first microlens array 1221 may be interleaved with microlenses in the second microlens array 1222 neighboring the first microlens array 1221.

For example, when the microlens arrays 1202 are arranged in two layers and have two refractive indices, respectively, an optical axis of a crystal of the first microlens array 1221 may be perpendicular to the display screen 1201, and an optical axis of a crystal of the second microlens array 1222 may be parallel to the display screen 1201. Microlenses in the second microlens array 1222 and microlenses in the first microlens array 1221 neighboring the second microlens array 1222 may be arranged at "m" pitches in a horizontal direction and a vertical direction. In this example, "m" may be "½," or other non-integer numbers.

A viewing angle of a 3D display may be increased, and thus it is possible to provide a user with a comfortable viewing experience of a 3D image. Also, an overlapping phenomenon may be reduced due to hopping of a view when a user moves his head. Because microlenses in each of the microlens arrays 1202 are interleaved with microlenses in a neighboring microlens array 1202, images that are formed by microlens arrays 1202 and that represent the same object may be different in positions and content from each other.

The polarization device 2120 may change a polarization direction to a direction parallel or perpendicular to the display screen 1201 based on a set polarization change period. Synchronously, the display 2110 may switch a first sub-image and a second sub-image included in a single frame of a 3D image, based on a set display switching period, and may display the first sub-image and the second sub-image on the same portion of the display screen 1201. Thus, it is possible to reduce (or alternatively, prevent) an overlapping phenomenon and to enable a user to view a 3D image at a wider viewing angle.

For example, the polarization device 2120 may change a polarization direction to the direction parallel to the display screen 1201 during one time segment of a display period of a single frame of a 3D image, and may change the polarization direction to the direction perpendicular to the display screen 1201 during another time segment. Synchronously, the display 2110 may display the first sub-image and the second sub-image on the same portion of the display screen 1201 during different time segments of the display period.

FIG. 4C illustrates a corresponding relationship between the display screen 1201 and each of the first microlens array 1221 and the second microlens array 1222.

Referring to FIG. 4C, the display image engine 1206 may control the display screen 1201 to display the first sub-image and the second sub-image on the same portion of the display screen 1201 during different time segments of the display period.

In Example 2, the first sub-image and the second sub-image may be acquired by converting the 3D image based on different image formation angles. For example, a first image formation angle may be determined based on an included angle between a center of the first microlens array 1221 and a center of the display screen 1201. Also, a second image formation angle may be determined based on an included angle between a center of the second microlens array 1222 and the center of the display screen 1201. The first sub-image and the second sub-image may be acquired by converting the 3D image based on the first image formation angle and the second image formation angle.

The optical axis of the crystal of the first microlens array 1221 may be perpendicular to the display screen 1201, and the optical axis of the crystal of the second microlens array 1222 may be parallel to the display screen 1201.

To increase a viewing angle of a 3D display, the 3D display apparatus of Example 2 may be used to perform the following scheme.

Referring to FIG. 4A, the display image engine 1206 may control the display screen 1201 to display the first sub-image on a first display portion of the display screen 1201 during one time segment of a display period of a single frame of a 3D image. Synchronously, the polarization controller 105 may control the polarizer 104 to change a polarization direction to the direction perpendicular to the display screen 1201. When the polarization direction is changed, the first microlens array 1221 may be set to have a different refractive index from a refractive index of the gap material layer 103. The display screen 1201 may display the first sub-image on the first display portion, and accordingly a 3D display may be implemented based on the first sub-image corresponding to the first microlens array 1221.

Referring to FIG. 4B, the display image engine 1206 may control the display screen 1201 to display the second sub-image on a second display portion of the display screen 1201 during another time segment of the display period. Synchronously, the polarization controller 105 may control the polarizer 104 to change a polarization direction to the direction parallel to the display screen 1201. When the polarization direction is changed, the second microlens array 1222 may be set to have a different refractive index from the refractive index of the gap material layer 103. The display screen 1201 may display the second sub-image on the second display portion, and accordingly a 3D display may be implemented based on the second sub-image corresponding to the second microlens array 1222. The first display portion and the second display portion may be the same.

In Example 2, the microlenses in the second microlens array 1222 may be interleaved with (or offset from) the microlenses in the first microlens array 1221. The polarization controller 105 may control an operation by which the polarizer 104 switches the polarization direction, at a high speed based on a frequency higher than a reaction time of a human eye. Synchronously, the display image engine 1206 may control the display screen 1201 to display sub-images on the same portion, and accordingly the first microlens array 1221 and the second microlens array 1222 may alternately form images.

When different image formation angles of microlens arrays to form a 3D image are quickly changed, effects generated by the above change may be combined and a performance of image formation may be enhanced. Thus, it is possible to ensure a greater viewing angle of a 3D display, in comparison to forming of an image using a single-layer microlens array.

Example 3

FIGS. 5A and 5B illustrate a configuration of a 3D display apparatus in Example 3.

Referring to FIGS. 5A and 5B, the 3D display apparatus may include a display 3110, microlens arrays 1302, and a polarization device 3120 that is installed between the display 3110 and the microlens arrays 1302. The microlens arrays 1302 may be arranged in two layers, and may include, for example, a first microlens array 1321 and a second microlens array 1322.

The display 3110 may include a display screen 1301 and a display image engine 1306 (e.g., implemented as a special purpose processor).

The polarization device 3120 may include a polarizer 104 and a polarization controller 105 (e.g., implemented as a special purpose processor).

The 3D display apparatus may further include a gap material layer 103 located between the microlens arrays 1302.

In an autostereoscopic 3D display technology with an optical grating, a central depth plane may be determined based on a focal length of a lens. A depth range of a 3D display may be formed around the central depth plane. In other words, the depth range of the 3D display may be associated with the focal length of the lens.

Microlenses in one microlens array 1302 may be aligned with microlenses in another microlens array 1302. The microlens arrays 1302 may have different focal lengths.

For example, the microlens arrays 1302 may be arranged in two layers and may have two refractive indices. In this example, microlenses in the first microlens array 1321 may be aligned with microlenses in the second microlens array 1322, and the first microlens array 1321 and the second microlens array 1322 may have different focal lengths.

Because the first microlens array 1321 and the second microlens array 1322 have different focal lengths, content of an image formed by the first microlens array 1321 may be different from content of an image formed by the second microlens array 1322 when the images represent the same object.

The polarization device 3120 may change a polarization direction to a direction parallel or perpendicular to the display screen 1301 based on a set polarization change period. Synchronously, the display 3110 may switch and display a first sub-image and a second sub-image included in a single frame of a 3D image, based on a set display switching period. The first sub-image and the second sub-image may be displayed on the same portion of the display screen 1301. Thus, a user viewing a 3D display may perceive displayed objects as the same object.

For example, the polarization device 3120 may change a polarization direction to the direction parallel to the display screen 1301 during one time segment of a display period of a single frame of a 3D image, and may change the polarization direction to the direction perpendicular to the display screen 1301 during another time segment. Synchronously, the display 3110 may control the display screen 1301 to display the first sub-image and the second sub-image on the same portion of the display screen 1301 during different time segments of the display period.

For example, the display image engine 1306 of the display 3110 may control the display screen 1301 to display the first sub-image and the second sub-image on the same portion of the display screen 1301 during different time segments of the display period.

In Example 3, the first sub-image and the second sub-image may be acquired by converting the 3D image based on different focal lengths. A first focal length coefficient and a second focal length coefficient may be a focal length of the first microlens array 1321 and a focal length of the second microlens array 1322, respectively.

An optical axis of a crystal of the first microlens array 1321 may be set to be perpendicular to the display screen 1301, and an optical axis of a crystal of the second microlens array 1322 may be set to be parallel to the display screen 1301.

To increase a depth range of a 3D display, the 3D display apparatus of Example 3 may be used to perform the following scheme.

Referring to FIG. 5A, the display image engine 1306 may control the display screen 1301 to display the first sub-image during one time segment of a display period of a single frame of a 3D image. Synchronously, the polarization controller 105 may control the polarizer 104 to change a polarization direction to the direction perpendicular to the display screen 1301.

When the polarization direction is changed, the first microlens array 1321 may be set to have a different refractive index from a refractive index of the gap material layer 103, and may operate as a single lens. The first sub-image corresponding to the first microlens array 1321 may be displayed by the display screen 1301. Based on the displayed first sub-image, a 3D display may be implemented.

Referring to FIG. 5B, the display image engine 1306 may control the display screen 1301 to display the second sub-image on the same portion as a portion on which the first sub-image is displayed during another time segment of the display period. Synchronously, the polarization controller 105 may control the polarizer 104 to change a polarization direction to the direction parallel to the display screen 1301.

When the polarization direction is changed, the second microlens array 1222 may be set to have a different refractive index from the refractive index of the gap material layer 103, and may operate as a single lens. The second sub-image corresponding to the second microlens array 1322 may be displayed by the display screen 1301. Based on the displayed second sub-image, the 3D display may be implemented.

In Example 3, the microlenses in the first microlens array 1321 may be aligned with the microlenses in the second microlens array 1322, and the first microlens array 1321 and the second microlens array 1322 may have different focal lengths. The polarization controller 105 may control an operation by which the polarizer 104 switches the polarization direction, at a high speed based on a frequency higher than a reaction time of a human eye. Synchronously, the display image engine 1306 may control the display screen 1301 to display sub-images on the same portion so that the first microlens array 1321 and the second microlens array 1322 may alternately form images.

Figure 5C:
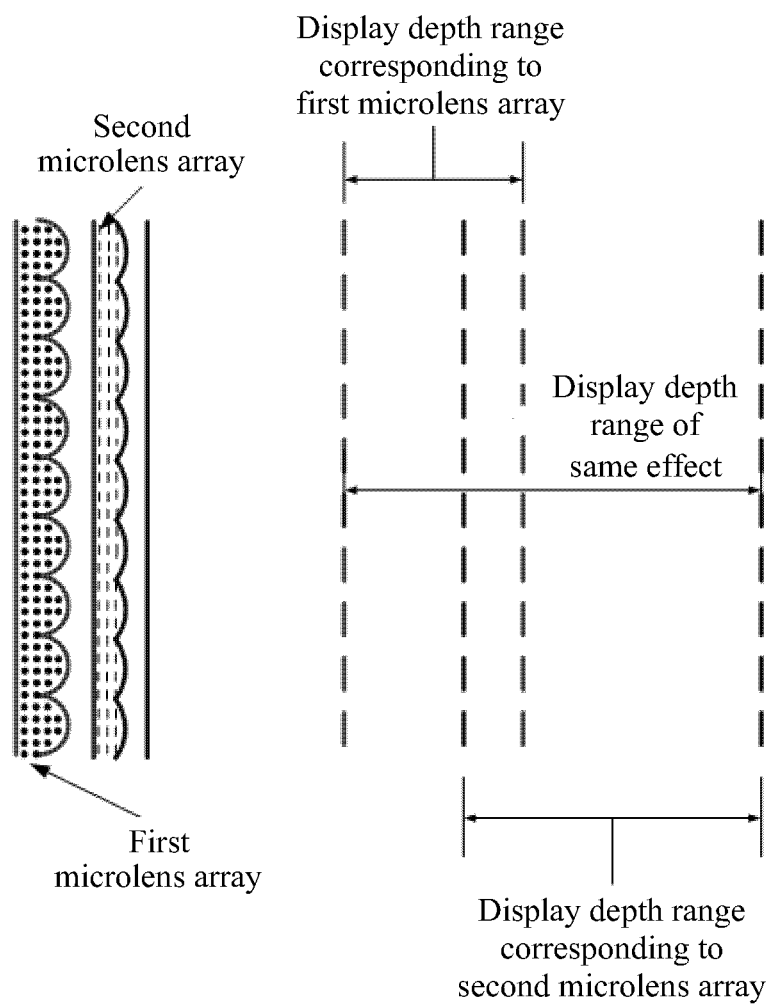
FIG. 5C illustrates examples of a display depth range corresponding to a microlens array according to at least one example embodiment.

Referring to FIG. 5C, a display depth range corresponding to the first microlens array 1321 may overlap with a display depth range corresponding to the second microlens array 1322. Thus, it is possible to enhance a quality of the 3D display by acquiring a single, relatively wide depth range of the 3D display.

According to at least one example embodiment, a 3D display may be implemented using microlens arrays arranged in at least two layers in a 3D display apparatus, and the microlens arrays may provide a viewing angle difference between a horizontal direction and a vertical direction. Thus, the 3D display apparatus may display a 3D image more realistically expressing a real object.

In addition, a focal length of each of the microlens arrays, and a position relationship between a display screen and each of the microlens arrays may be controlled. A polarization controller may control a polarizer to change a polarization direction using a TDM, and accordingly optical refraction may occur alternately in each of the microlens arrays. Synchronously, a display screen may display a sub-image corresponding to a microlens array in which refraction currently occurs, under a control of a display image engine. Thus, it is possible to enhance a quality of a 3D display, for example, a display resolution, a display depth range or a display viewing angle.

Figure 6:
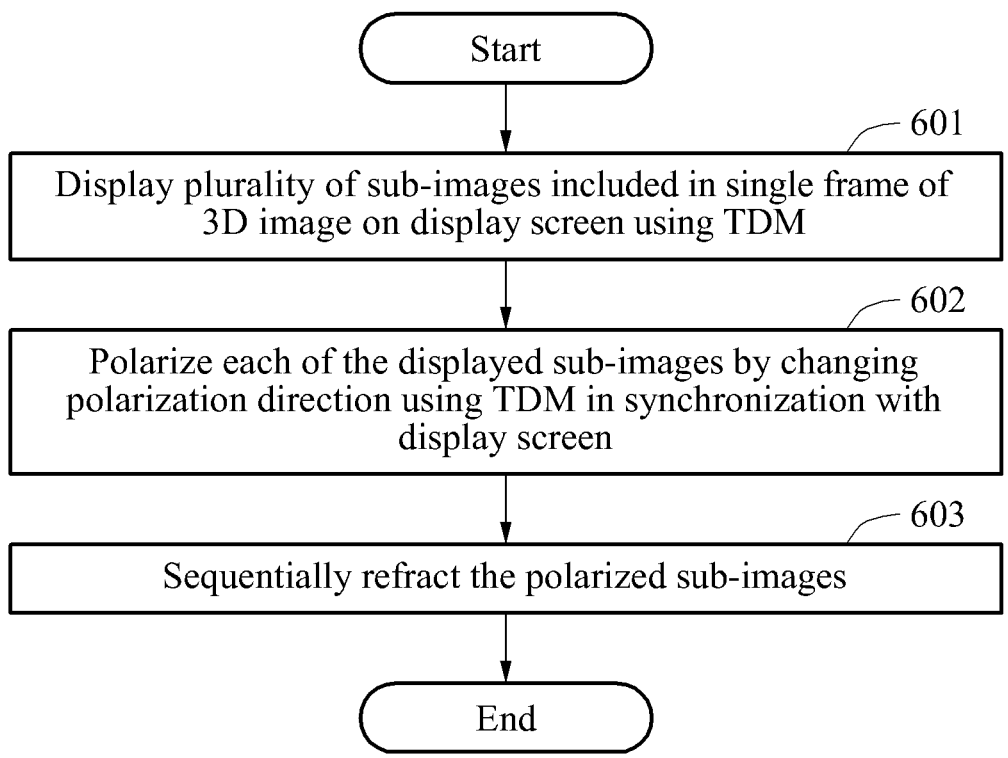
FIG. 6 is a flowchart illustrating a 3D display method according to at least one example embodiment.

FIG. 6 is a flowchart illustrating a 3D display method according to at least one example embodiment.

The 3D display method may be performed by a 3D display apparatus according to at least one example embodiment. For example, the 3D display method may be performed by the 3D display apparatus of FIG. 3. In this example, the display 110 may display a 3D image, the polarization device 120 may change a polarization direction using TDM, and the microlens arrays 102 may sequentially refract light. The 3D display method will be further described with reference to FIG. 6.

Referring to FIG. 6, in operation 601, a display screen of the 3D display apparatus may display a plurality of sub-images included in a single frame of a 3D image using TDM.

In operation 602, a polarizer of the 3D display apparatus may polarize each of the displayed sub-images by changing a polarization direction using TDM, in synchronization with the display screen.

In operation 603, microlens arrays of the 3D display apparatus may sequentially refract the polarized sub-images, respectively. The microlens arrays may be arranged in a plurality of layers.

The above-described examples of the 3D display apparatus may be applicable to operations 601 through 603. In the 3D display method, the display screen may be controlled by a display image engine, and the polarizer may be controlled by a polarization controller. The above description of FIGS. 1 through 5C may be also applicable to the 3D display method of FIG. 6, and accordingly is not repeated herein.

The units, modules, engines, and controllers (e.g., display image engines and polarization controllers) described herein may be implemented using hardware components, software components, or a combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (e.g., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) display apparatus comprising:
   a display screen configured to display each of a plurality of sub-images included in a single frame of a 3D image using time-division multiplexing (TDM);
   a polarizer configured to polarize each of the displayed sub-images by changing a polarization direction in synchronization with the display screen;
   microlens arrays configured to sequentially refract the polarized sub-images, respectively, the microlens arrays being arranged in a plurality of layers and including a first microlens array and a second microlens array; and
   at least one gap material layer located between the microlens arrays, and
   wherein when the polarizer changes the polarization direction to the direction perpendicular to the display screen, a refractive index of the first microlens array is set to be different from a refractive index of the gap material layer, and a refractive index of the second microlens array is set to be the same as the refractive index of the gap material layer.

2. The 3D display apparatus of claim 1, wherein the polarizer is configured to change the polarization direction based on a relationship between the display screen and a direction of an optical axis of a crystal of each of the microlens arrays.

3. The 3D display apparatus of claim 1, wherein
the microlens arrays have a plurality of refractive indices, respectively, and the plurality of refractive indices are adjustable by a setting voltage;
the refractive index of the first microlens array is different from a refractive index of the gap material layer, and the first microlens array is configured to refract a polarized sub-image; and
the refractive index of the second microlens array is the same as the refractive index of the gap material layer, and the second microlens array is-configured to not refract a polarized sub-image.

4. The 3D display apparatus of claim 1, wherein the plurality of sub-images are acquired by converting the 3D image based on at least one of a focal length of each of the microlens arrays and an angle between a center of each of the microlens arrays and a center of the display screen.

5. The 3D display apparatus of claim 1, wherein
the plurality of sub-images comprise a first sub-image and a second sub-image;
the display screen is configured to display the first sub-image and the second sub-image during a first time segment and a second time segment, respectively;
the polarizer is configured to,
polarize the first sub-image by changing the polarization direction to a direction perpendicular to the display screen, and
polarize the second sub-image by changing the polarization direction to a direction parallel to the display screen;
the first microlens array includes a crystal with an optical axis crystal of the first microlens array is perpendicular to the display screen, and the first microlens array is configured to refract the first sub-image; and
the second microlens array includes a crystal with an optical axis parallel to the display screen, and the second microlens array is configured to refract the second sub-image.

6. The 3D display apparatus of claim 5, wherein
the first sub-image is acquired by converting the 3D image based on an angle between a center of the first microlens array and a center of the display screen, and
the second sub-image is acquired by converting the 3D image based on an angle between a center of the second microlens array and the center of the display screen.

7. The 3D display apparatus of claim 5, wherein
the first sub-image is acquired by converting the 3D image based on a focal length of the first microlens array; and
the second sub-image is acquired by converting the 3D image based on a focal length of the second microlens array.

8. The 3D display apparatus of claim 5, wherein
the first microlens array and the second microlens array have the same focal length; and
the first microlens array and the second microlens array each include a plurality of microlenses, and the microlenses in the first microlens array are offset from the microlenses in the second microlens array.

9. The 3D display apparatus of claim 5, wherein
the first microlens array and the second microlens array have different focal lengths; and
the first microlens array and the second microlens array each include a plurality of microlenses, and the microlenses in the first microlens array are aligned with the microlenses in the second microlens array.

10. The 3D display apparatus of claim 5, further comprising:
a gap material layer located between the first microlens array and the second microlens array; and wherein
a refractive index of each of the first microlens array and the second microlens array is adjustable by a setting voltage, and
when the polarizer changes the polarization direction to the direction parallel to the display screen, the refractive index of the first microlens array is set to be the same as the refractive index of the gap material layer, and the refractive index of the second microlens array is set to be different from the refractive index of the gap material layer.

11. A three-dimensional (3D) display method comprising:
displaying, by a display screen, each of a plurality of sub-images included in a single frame of a 3D image using time-division multiplexing (TDM), the plurality of sub-images including a first sub-image and a second sub-image;
polarizing, by a polarizer, each of the displayed sub-images by changing a polarization direction in synchronization with the display screen; and
sequentially refracting, by microlens arrays, the polarized sub-images, respectively, the microlens arrays being arranged in a plurality of layers and including a first microlens array and a second microlens array,
wherein at least one gap material layer is located between the microlens arrays, and
the refracting of the second sub-image comprises, when the polarization direction is changed to the direction parallel to the display screen, setting a refractive index of the first microlens array to be the same as a refractive index of the gap material layer, and setting a refractive index of the second microlens array to be different from the refractive index of the gap material layer.

12. The 3D display method of claim 11, wherein the polarizing of each of the displayed sub-images comprises changing the polarization direction based on a relationship between the display screen and a direction of an optical axis of a crystal of each of the microlens arrays.

13. The 3D display method of claim 11, wherein
each of the microlens arrays have a plurality of refractive indices, respectively, and the plurality of refractive indices are respectively adjustable by a setting voltage; and
the sequentially refracting of the polarized sub-images comprises,
refracting a polarized sub-image by the first microlens array, among the microlens arrays, with the refractive index of the first microlens array being different from the refractive index of the gap material layer, and
not refracting a polarized sub-image by the second microlens array, among the microlens arrays, with the refractive index of the second microlens array being the same as the refractive index of the gap material layer.

14. The 3D display method of claim 11, wherein the plurality of sub-images are acquired by converting the 3D image based on at least one of a focal length of each of the microlens arrays and an angle between a center of each of the microlens arrays and a center of the display screen.

15. The 3D display method of claim 11, wherein the displaying of each of the sub-images comprises displaying the first sub-image and the second sub-image during a first time segment and a second time segment, respectively;

the polarizing of each of the displayed sub-images comprises, polarizing the first sub-image by changing the polarization direction to a direction perpendicular to the display screen, and polarizing the second sub-image by changing the polarization direction to a direction parallel to the display screen; and the sequentially refracting of the polarized sub-images comprises, refracting the first sub-image by the first microlens array if an optical axis of a crystal of the first microlens array is perpendicular to the display screen, and refracting the second sub-image by the second microlens array if an optical axis of a crystal of the second microlens array is parallel to the display screen.

16. The 3D display method of claim 15, wherein the first sub-image is acquired by converting the 3D image based on an angle between a center of the first microlens array and a center of the display screen; and the second sub-image is acquired by converting the 3D image based on an angle between a center of the second microlens array and the center of the display screen.

17. The 3D display method of claim 15, wherein the first sub-image is acquired by converting the 3D image based on a focal length of the first microlens array; and the second sub-image is acquired by converting the 3D image based on a focal length of the second microlens array.

18. The 3D display method of claim 15, wherein the first microlens array and the second microlens array have the same focal length; and microlenses in the first microlens array are offset from microlenses in the second microlens array.

19. The 3D display method of claim 15, wherein the first microlens array and the second microlens array have different focal lengths; and microlenses in the first microlens array are aligned with microlenses in the second microlens array.

20. The 3D display method of claim 15, wherein a gap material layer is located between the first microlens array and the second microlens array;

the refractive index of each of the first microlens array and the second microlens array is adjustable by a setting voltage; and the refracting of the first sub-image comprises, when the polarization direction is changed to the direction perpendicular to the display screen, setting the refractive index of the first microlens array to be different from the refractive index of the gap material layer, and setting the refractive index of the second microlens array to be the same as the refractive index of the gap material layer.

* * * * *